Jan. 5, 1965 W. J. DE CHELBOR Re. 25,707

PLASTIC CARRYING CASE FOR BOTTLES

Original Filed March 28, 1960 6 Sheets-Sheet 1

INVENTOR.
William J. De Chelbor,
BY
Parker & Carter
Attorneys.

PLASTIC CARRYING CASE FOR BOTTLES

Original Filed March 28, 1960 6 Sheets-Sheet 2

INVENTOR.
William J. De Chelbor,
BY
Parker & Carter
Attorneys.

PLASTIC CARRYING CASE FOR BOTTLES

Original Filed March 28, 1960 6 Sheets-Sheet 3

INVENTOR.
William J. De Chelbor,
BY
Parker & Carter
Attorneys.

INVENTOR.
William J. De Chelbor,
BY
Parker & Carter
Attorneys.

PLASTIC CARRYING CASE FOR BOTTLES

Original Filed March 28, 1960 6 Sheets-Sheet 5

INVENTOR.
William J. De Chelbor,
BY Parker & Carter
Attorneys.

INVENTOR.
William J. De Chelbor,
BY
Parker & Carter
Attorneys.

United States Patent Office

Re. 25,707

Reissued Jan. 5, 1965

25,707

PLASTIC CARRYING CASE FOR BOTTLES

William J. de Chelbor, Chicago, Ill., assignor, by mesne assignments, to General American Transportation Corporation, Chicago, Ill., a corporation of New York Original No. 3,045,862, dated July 24, 1962, Ser. No. 17,916, Mar. 28, 1960. Application for reissue June 17, 1964, Ser. No. 389,503

21 Claims. (Cl. 220—102)

Matter enclosed in heavy brackets [ ] appears in the original patent but forms no part of this reissue specification; matter printed in italics indicates the additions made by reissue.

This invention is in the field of carrying cases for pop bottles and the like and is concerned with a so-called six or eight pack. This is an improvement on Serial No. 852,766, filed November 13, 1959.

A primary object of the invention is an all plastic bottle carrying case.

Another object is a carrying case which will have a much greater trip life.

Another object is a carrying case which may be used over and over and may be completely cleaned and sterilized between trips.

Another object is a carrying case of the above type in which the handle is separate.

Another object is an all plastic carrying case in which the handle is separately molded and then attached to the body of the case.

Another object is an all plastic carrying case which may be either a six or an eight pack .

Another object is a carrying case which will automatically interlock with the tops of the bottles in a like case below.

Another object is a carrying case which will be free of vermin at all times and will not disintegrate or decay when left out in the weather.

Another object is a carrying case which, while made entirely of plastic, is simple to manufacture, sturdy in construction, and reliable in use.

Other objects will appear from time to time in the ensuing specification and drawings wherein several embodiments of my invention are described.

Figure 1:
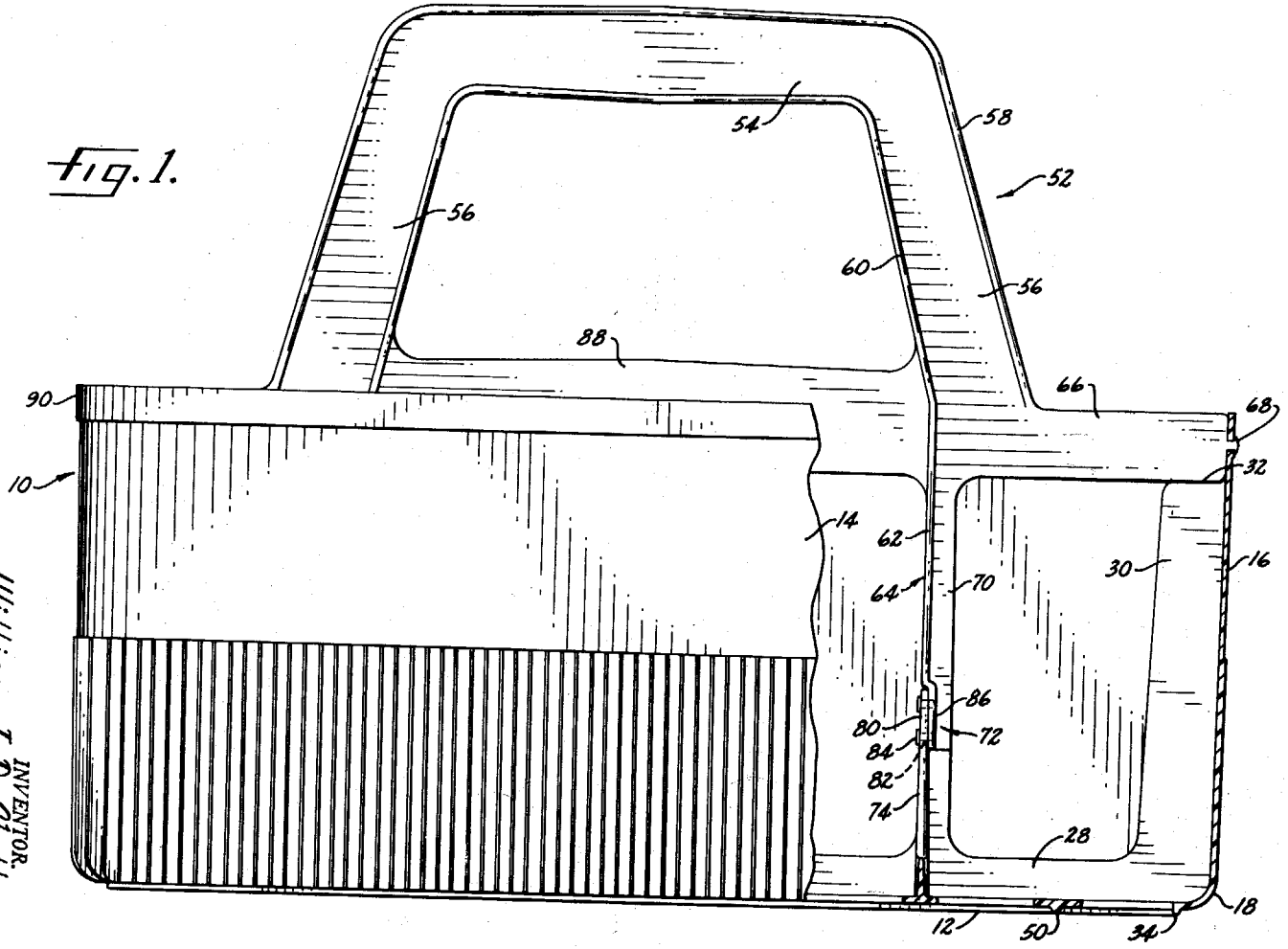
FIGURE 1 is a front elevation in partial section of one embodiment of my invention.

As shown in FIGURES 1 through 4, one embodiment of my carrying case is indicated generally at 10 and includes a base 12, shown as somewhat rectangular, with upstanding sides 14 and ends 16 formed integrally with the base by well rounded edges 18 and to each other by well rounded corners 20.

Figure 3:
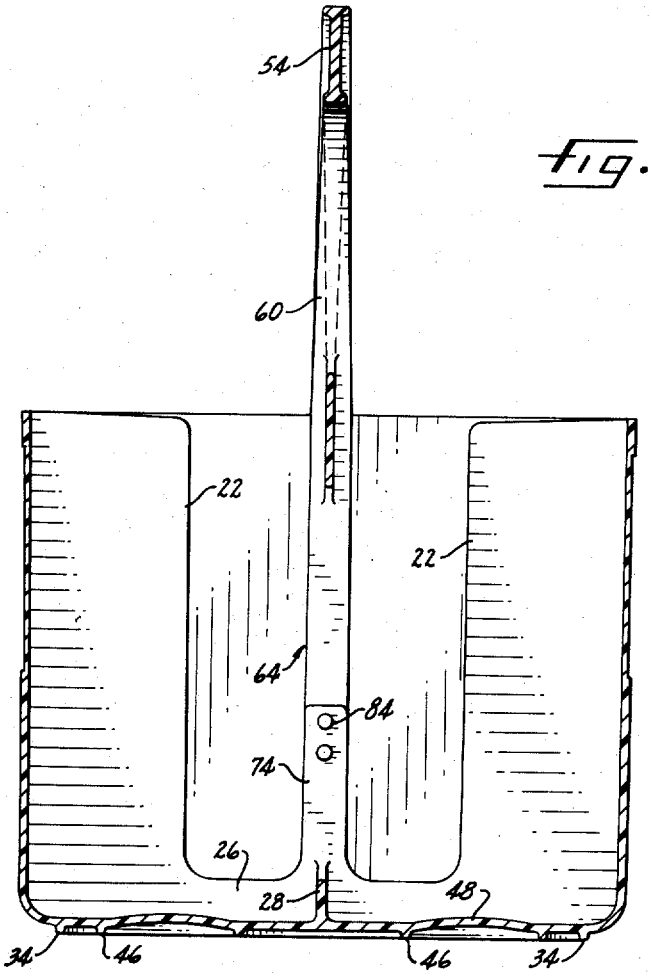
FIGURE 3 is an end view in section along the line 3—3 of FIGURE 2.

Lateral dividers 22 project inwardly from each side 14 toward the center. I show three such lateral dividers, more or less equally spaced, projecting inwardly from each side and, as shown in FIGURE 3, the dividers only go about to the center half-way, or possibly a little over half way, the precise amount not being critical. In any event, the dividers terminate in substantial spaced relation to the center, and since three are used, each side is divided generally into four bottle pockets, designated generally 24. Thus the case will handle some eight bottles, but if a six pack is preferred, only two such dividers would be used dividing each side into three pockets. The dividers are formed integrally with the side wall and the foot of each divider extends inwardly in a lateral web 26 which joins a center longitudinal web 28 which is integral with the base. The longitudinal web rises at each end to form end dividers 30 which stop short of the top of the end wall, as at 32.

Figure 2:
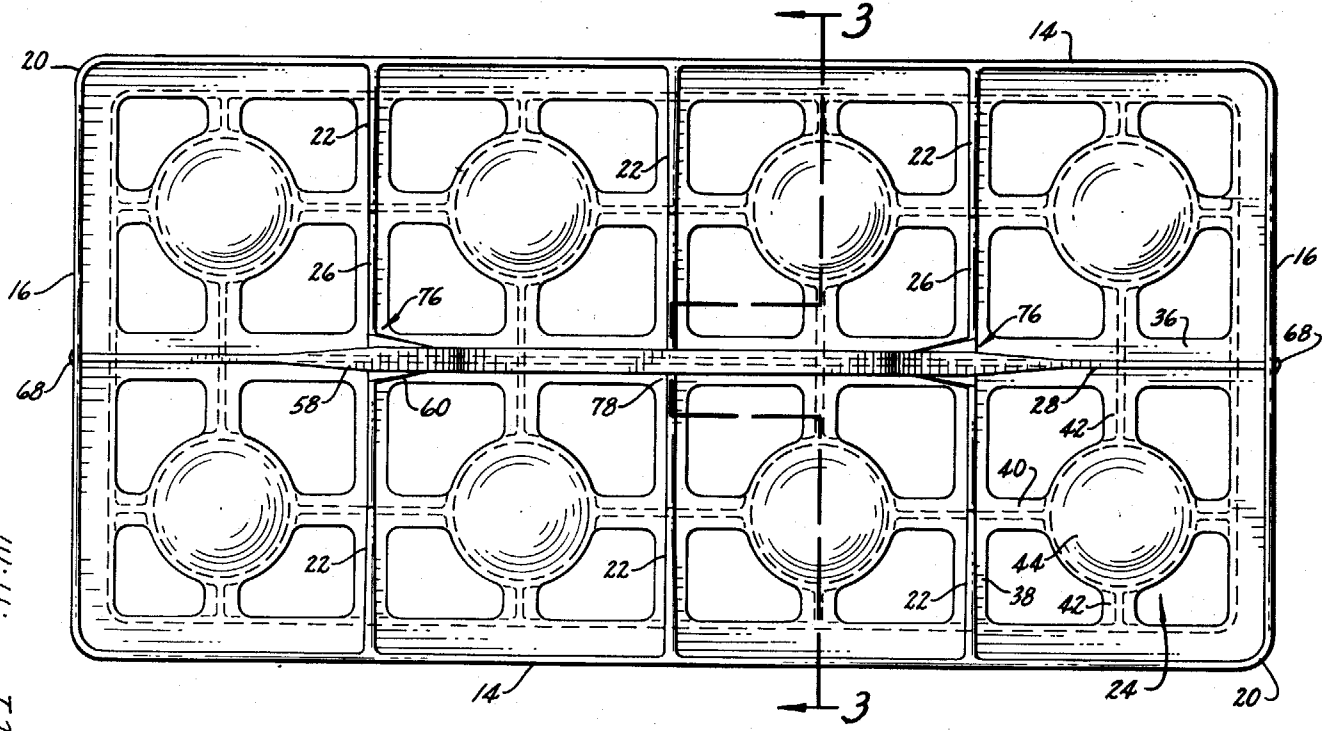
FIGURE 2 is a plan view of FIGURE 1.
Figure 4:
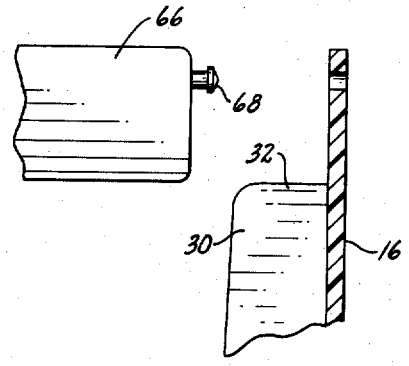
FIGURE 4 is a partial view, on an enlarged scale, of a detail.

As shown in FIGURE 2, the base or bottom of each bottle pocket 24 is provided with openings and a web or grill type structure so that the carrying case may be washed and sterilized between trips. On the bottom surfaces of the base, a bead 34 parallels the sides and ends and extends all the way around. The base has a central longitudinal strip 36 extending from end to end which is integral with the longitudinal rib 28. A plurality of lateral cross strips 38, shown in this case as three, are integral with the longitudinal strip 36 as well as the lateral ribs 26 to define the eight pockets.

Each pocket 24 has longitudinal and lateral strips or straps 40 and 42 extending into a center hub 44 which is outlined on the lower surface thereof by a circular bead 46. As shown in FIGURE 3, the hub is domed up somewhat or formed into a crown 48 projecting slightly up into the pocket to resiliently support a bottle. From the bottom the crown, with the surrounding rim 46, provides a socket to receive the top or cap of a like bottle in a case below it when two or more such cases are stacked. This provides a firm interlock which will keep the top case from sliding off when the units are vibrated or shaken. The strips 40 and 42 take on a T-shaped cross section due to a bead on the bottom thereof, as at 50.

A handle 52 rising from the interior of the container is removably connected as set forth hereinafter. In detail the handle includes a vertical top web 54 with slanting webs 56 at each end, all framed by upper and lower strips 58 and 60. The lower strip 60 widens or tapers outwardly, as shown in FIGURE 3, as it parallels the diagonal webs 56 downwardly until it flows integrally into the cross strips 62 of a lower leg 64 which may be of a uniform width all the way down. The top strip 58 does just the opposite and narrows or tapers inwardly as it comes down until it comes to the width or thickness of the web 56, as shown in FIGURE 2. Each end is provided with a strap 66 which extends longitudinally to connect to the end 16 by a button-in-hole connection 68. It will be noted that the strap 66 rests on the top of the end dividers 30.

The web 56 extends down along the leg 64 at 70 in a T-shaped cross section to a joint 72 between the leg and an upstanding stub 74 rising up from the base. It will be noted that the stub 74 has a cross section like the leg 64 and rises up from the inner section between the longitudinal strip 36, longitudinal rib 28, lateral strip 38 and lateral ribs 26. Since there are two such joints, two stubs 74 are provided rising up from two joints, designated generally 76, and the center joint around section 78 does not have a stub. Each of the stubs 74 has a fastening tab 80 with one or more holes 82 to receive buttons 84 positioned on an offset 86 in the cross piece of the T-shaped legs. The center of the handle may have a longitudnal brace 88 if desired. I prefer that the top rim of the sides and ends 14 and 16 be somewhat thickened as at 90 to prevent splitting.

Figure 5:
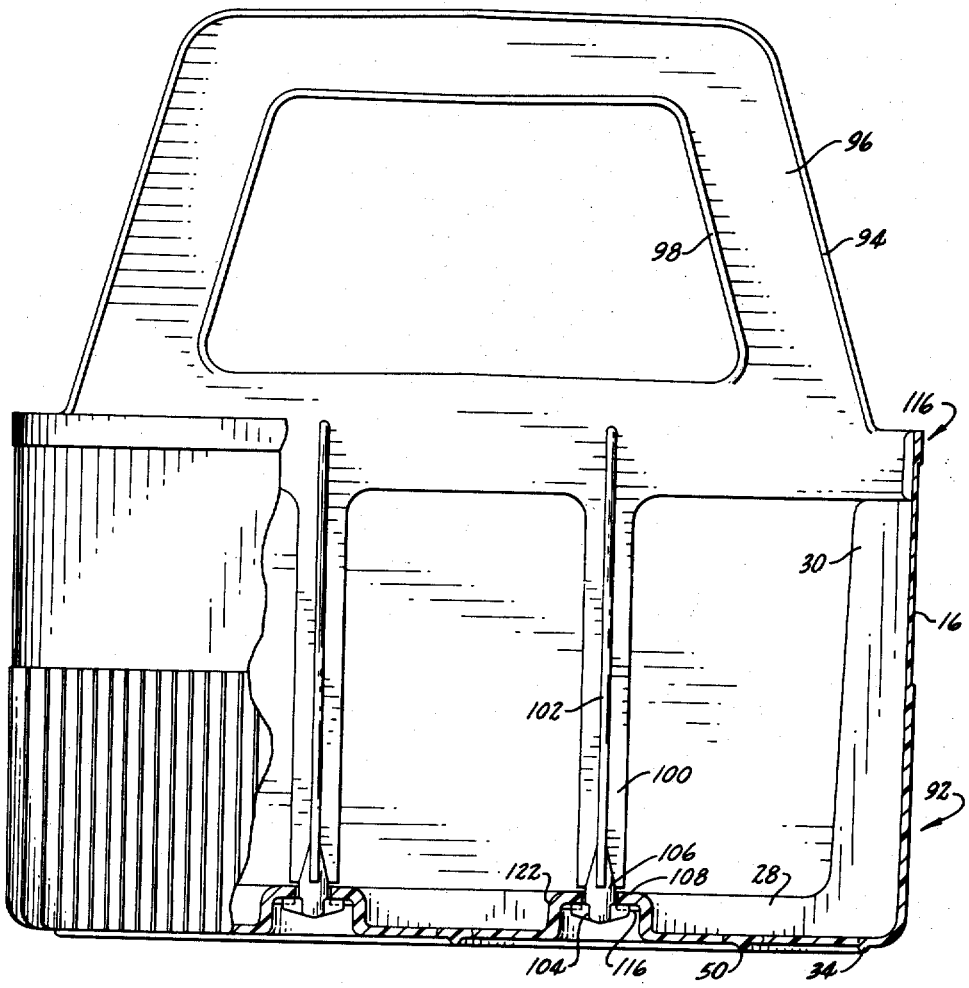
FIGURE 5 is a front elevation in partial section of another embodiment of my invention.
Figure 6:
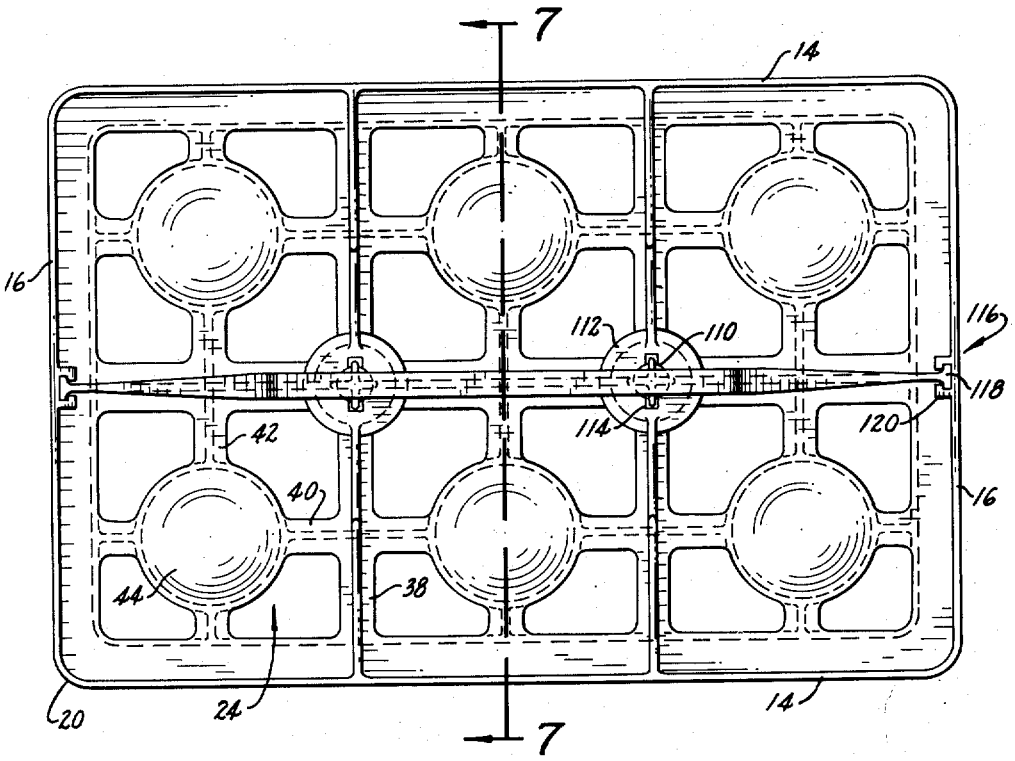
FIGURE 6 is a plan view of the embodiment of FIGURE 5.
Figure 7:
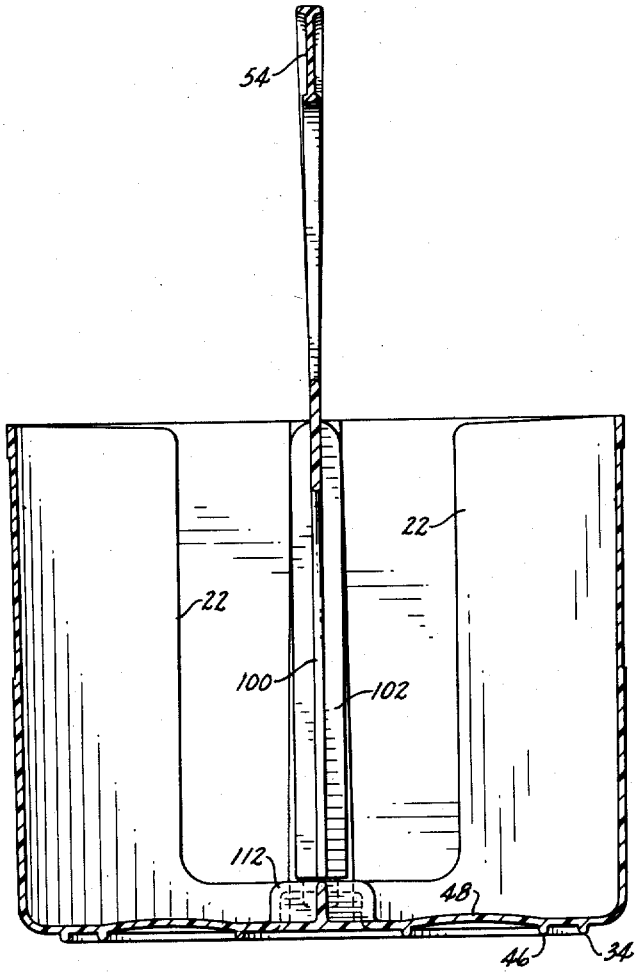
FIGURE 7 is an end view in section along line 7—7 of FIGURE 6.

A second embodiment of my invention is indicated generally at 92 in FIGURES 5–7 and includes a body generally similar to that of the previous form with a base, upstanding sides and ends formed integrally with the base by rounded edges and to each other by rounded corners.

Lateral dividers project inwardly from each side toward the center. In this form I show two such lateral dividers generally equally spaced. The dividers only go about half way to the center, the precise amount not being critical. Since two dividers are shown, each side of the case is divided generally into three bottle pockets. Thus the case shown is a 6 bottle pack but if an 8 pack is preferred, 3 dividers could be utilized dividing each side into 4 pockets. This form differs from the previous form in the following respects.

A unitary handle 94 rising from the interior of the container includes a web framed by upper and lower strips or slats 96 and 98, both of which are tapered downwardly to merge smoothly with the cross strip, as shown in FIGURE 5. Spaced legs 100 depend from the cross strip and outstanding ribs 102 may be provided on each side of the legs which merge into integral locking vanes 104 formed on an enlargement 106. The locking vanes are spaced from the legs and ribs so that a slot or annular groove 108 is provided.

Each of the legs is flexible and may be twisted a given amount so that the vanes are disposed at right angles to their normal position. The vanes may then be pushed through an opening 110 in the top of a socket 112 formed at the junction of two of the slats in the bottom or grill. Note that the opening has lateral slots 114 so that the vanes may go through. When pushed through, the spring or return effect of the twisted legs will cause them to snap the vanes back to the longitudinal. The bottom or under surface of the socket may be formed with spaced ribs 116 so that once the vanes return, they will fit between the ribs which hold them in place. The dimensioning of the annular groove 108 and the distance the vanes must travel in seating should be such that a slight forced or compression fit is provided. I prefer that the side walls of the socket, as at 122, are slightly tapered so that the bottles will not hang up.

I also provide a dovetail or T connection between the end straps and the end walls, as at 116, which enclose a T 118 formed on the end strap of the handle which fits into a dovetail groove 120 formed in the inner surface of the end wall. The dimensioning is such that when the handle is lowered into the case, with the legs twisted, the T will enter the dovetail slot before the vanes start into the sockets.

The use, operation and function of my invention are as follows:

I provide an all plastic carrying case for pop bottles or the like which may be either a six or eight pack or, for that matter, may be constructed to carry any suitable number of bottles. As examples only, I have set out the eight pack container in describing the first embodiment of my invention and the six pack in the description of the second.

The handle structure is molded separately from the case itself so that the two may be shipped in knocked down condition to the bottler. It will be noted that in both embodiments of my invention the handle may be inserted and mounted without regard to which end is disposed in either direction. In the first form once the handle is in place and the buttons have been snapped through the various openings, the dimensioning is such that a tight fit and interlock is attained and thereafter the unit is, in effect, one piece. In the second form as the legs are twisted and the vanes inserted in the laterally extending slots, the T shaped guides simultaneously are seated in the dovetail groove and retained snugly by virtue of the fact that the vanes are resiliently returned to normal longitudinal alignment and cannot be dislodged from the slot. The result is a tight fit and interlock is attained.

The dividers extending in from the side walls are very important. In addition to dividing the case into bottle pockets, the dividers are also integral with the side walls and therefore substantially strengthen the overall case. These dividers are also integral with the ribs upstanding from the base which makes the overall carrying case a rugged structure unit.

At the same time the base is made up of interconnected slats and ribs defining a number of openings which facilitate washing and sterilization of the carrying case.

Each pocket has a resilient seat in the form of a dome upon which the bottles rest and are centered by. In addition the domes also interlock with the caps on the bottles in the case stacked below the case described. As a result, relative horizontal movement of the nested cases is prevented.

In the FIGURE 5 form, the two part container may be assembled by machines which lower the handle structure into the container with the legs twisted. When fully seated, the legs are released to spring back to locked position. Only 90° of twist is required but more or less may be used. The dovetail connections 116 at each end provide automatic piloting of the handle structure since the T's 118 are inserted before the vanes enter the sockets. The T and dovetail groove may be tapered slightly to wedge together when the legs are fully locked in the sockets.

The posts and straps of the case and all elements of construction generally are thin and the overall dimensions are roughly equivalent of a paper case. Consequently, the case will fit in present day automatic filling equipment without difficulty.

The handle itself may be easily grasped and is quite strong, whether it is constructed for an eight pack or a six pack.

While I have shown and described several variations of my invention, it should be understood that suitable additional improvements, changes, substitutions and alterations may be made without departing from the invention's fundamental theme. Therefore, I wish that the invention be unrestricted except as by the appended claims.

I claim:

1. In a carrying case for pop bottles or the like, a base, a continuous side structure around the base with side and end walls upstanding from its outer edge defining an open top container for bottles, an integral molded handle structure upstanding from the general center of the base and rising above the top of the side structure, said handle structure having a pair of downwardly extending legs thereon detachably connecting said handle structure rigidly to said base, straps extending longitudinally from the handle structure detachably connected to the end walls, and lateral dividers projecting inwardly from the side structure and terminating in spaced relation to the handle structure out of contact therewith at all points to define a plurality of bottle pockets therewith.

2. The structure of claim 1 further characterized in and including buttons for detachably connecting the legs to the base.

3. The structure of claim 1 further characterized in that the legs are torsionally deformable in connecting the handle to the base, and a connection between each leg and the base including a vane on one and a slot on the other corresponding to the vane, the vane and slot being misaligned when free with each leg being sufficiently torsionally deformable such that the vane and slot can be made to temporarily line up for initial assembly.

4. In a two part carrying case for pop bottles or the like, an integrally molded base and peripherally continuous side structure defining an open top container for bottles, an integrally molded handle structure upstanding from the general center of the base rising above the top of the side structure, said handle structure having means thereon detachably connecting said handle structure rigidly to said base, integral straps extending longitudinally from the handle structure, means on the ends of the straps for detachably securing the straps to each end of the side structure, and integral lateral dividers projecting inwardly from the side structure and terminating in spaced relation to the handle structure to define a plurality of bottle pockets therewith.

5. In a carrying case for pop bottles or the like, a base, a side structure around the base and upstanding from its outer edge defining an open container for bottles and including two longitudinal sides interconnected by lateral ends, a handle upstanding from the general center of the base and rising above the upper edge of the sides and ends and dividers in the container dividing it into a plurality of bottle pockets, the base being formed as a generally open grill subdivided into separate pockets by a plurality of lateral and longitudinal intersecting strips, each pocket having an upwardly domed crown in the general center thereof connected to the strips by a plurality of straps radiating from the crown.

6. The structure of claim 5 further characterized in that the handle is disconnectably attached to the base and ends only.

7. The structure of claim 5 further characterized in that the handle is disconnectably attached to the base, the base including upstanding stubs terminating below the upper edge of the sides and ends and a joint between the upper end of the stubs and the handle so that the handle may be removed.

8. The structure of claim 5 further characterized in that the handle includes longitudinally straps, means disconnectably attaching said straps to the ends of said side structure.

9. The structure of claim 8 further characterized in that said last mentioned connecting means includes buttons on said straps disconnectably insertable in holes in said ends.

10. The structure of claim 8 further characterized in that said last mentioned connecting means includes vertically extending guides on said straps insertable in vertically extending grooves on said ends.

11. In a carrying case for pop bottles or the like, a base, a side structure around the base and upstanding from its outer edge defining an open top container for bottles and including two longitudinal sides interconnected by lateral ends, a handle upstanding from the general center of the base and rising above the upper edge of the sides and ends, button means on said handle extending longitudinally of said case, upstanding stubs on said base teriminating below the upper edge of said sides and ends, said stubs having apertures therein, said button means being detachably insertable in said apertures, longitudinal straps extending from said handle, button means on said straps, apertures in said ends, said last mentioned button means being disconnectably insertable in said last mentioned apertures, and dividers in the container dividing it into a plurality of bottle pockets, the base in each pocket being formed upwardly somewhat into a convex crown concave on its lower surface.

12. In a carrying case for pop bottles or the like, a base, a side structure around the base and upstanding from its outer edge defining an open top container for bottles and including two longitudinal sides interconnected by lateral ends, a handle upstanding from the general center of the base and rising above the upper edge of the sides and ends, at least one raised portion in said base, a slot in said raised portion extending in a defined direction, at least one vane depending from said handle, and extending in a defined direction at a decided angle to the direction of the slot, the vane being of a material that is sufficiently torsionally deformable to permit the vane to be turned into alignment with the slot to provide for insertion of the vane in the slot, and to return to its defined direction after insertion and release, straps extending longitudinally from the handle structure, vertically extending guide T's on the ends of the straps, vertically extending dovetail grooves on the lateral ends, said guide T's being seated in said grooves when said tabs are inserted in said slots, and dividers in the container dividing it into a plurality of bottle pockets.

13. In a carrying case for bottles and the like, a base and side structure defining an open top container for bottles and including two longitudinal sides interconnected by lateral ends, a handle upstanding from the general center of the base and rising above the upper level of the sides and ends, a connection between the handle and base including at least one slot on one of them extending in a defined direction and at least one vane on the other normally extending in a defined direction, and an additional connection between the handle and side structure so that the handle will be disposed, when mounted therein, in a defined direction, the normal direction of each vane, when the handle is so mounted, being at a decided angle to the direction of the slot, the material of the vane being sufficiently flexible such that it may be twisted to cause alignment of the vane with the slot when the handle is so mounted in the container and, when released after insertion, will tend to return the vane to its defined direction to thereby interlock the handle in the container.

14. In a carrying case for pop bottles and the like, an integral base and side structure upstanding from and around the sides of the base, the side structure including side and end walls and defining with the base an open topped container for bottles, and a one piece integral handle structure connected to and upstanding from the general center of the base and rising above the top of the side structure, the handle structure including at least one leg disconnectably and rigidly joined to the base, and a plurality of straps integrally formed with the handle structure and extending longitudinally therefrom and disconnectably and rigidly joined to the end walls.

15. In a carrying case for pop bottles or the like, a base, a continuous wall structure around the base with side and end walls and upstanding from the outer edge of the base to thereby define an open topped container for bottles, a one piece integral molded handle structure upstanding from the general center of the base and rising above the top of the wall structure, said handle structure having at least one downwardly extending leg thereon detachably connecting said handle structure rigidly to the base, each leg being torsionally deformable in connecting the handle to the base, a connection between each leg and the base including a vane on one and a slot on the other corresponding to the vane, the vane and slot being misaligned when free with each leg being sufficiently torsionally deformable such that the vane and slot can be made to temporarily line up for initial assembly, straps extending from the handle structure and detachably connected to the wall structure, and lateral dividers between the wall structure and the handle structure integrally molded to one of them and terminating in spaced relation to the other out of contact therewith at all points to define a plurality of bottle pockets therewith.

16. In a carrying case for pop bottles and the like, an integral base and side structure upstanding from and around the sides of the base, the side structure including side and end walls and defining with the base an open topped container for bottles, and a one piece integral handle structure connected to and upstanding from the general center of the base and rising above the top of the side structure, the handle structure including at least one leg disconnectably and rigidly joined to the base, and a connection at each end of the handle structure and integrally formed therewith extending longitudinally therefrom and disconnectably and rigidly joined to the end walls.

17. In a carrying case for pop bottles and the like, a base, a side structure around the base and upstanding from its outer edge defining an open topped container for bottles and including two longitudinal sides interconnected by lateral ends molded integrally with the base and forming one piece, a handle upstanding from the general center of the carrying case rising above the upper edge of the side structure and dividers in the container dividing it into a plurality of bottle pockets, the base being formed as a unitary molded generally open grill subdivided into a plurality of pockets by a plurality of generally rectilinear lateral and longitudinal integrally interconnected strips, each pocket having an upwardly domed crown in the general center thereof integrally connected only to the strips by a plurality of straps radiating from each crown, and an annular bead integrally molded on the base and projecting downwardly from and generally defining the periphery of each crown to surround and interlock with the top of a bottle below it providing lateral stability when such carrying cases are filled and stacked.

18. The structure of claim 17 further characterized in that the annular bead projecting down from and generally defining the periphery of each crown is continuous and uninterrupted around each crown, the straps radiating from each crown connecting it to the lateral and longitudinal integrally interconnected strips being disposed generally parallel to the strips so as to be generally lateral and longitudinal.

*19. A carrying case for pop bottles, or the like, comprising a basket-like body molded of plastic material and including a substantially rectangular bottom wall and a pair of substantially parallel upstanding side walls and a pair of substantially parallel upstanding end walls and having an open top, said five walls named being integrally joined together along the several junctions therebetween, divider structure molded of plastic material and including a plurality of upstanding intersecting divider walls, said divider structure being disposed within said body and arranged to divide the interior of said body into a plurality of bottle-receiving pockets having open tops and readily accessible from the exterior, the bottoms of said divider walls being integrally joined to said bottom wall and the ends of said divider walls being integrally joined to the respectively adjacent ones of said side and end walls and defining a corresponding plurality of pocket bottom walls, one of said divider walls extending longitudinally between said end walls and located substantially centrally between said side walls and substantially parallel thereto, a corresponding plurality of crown-centering members respectively carried by said pocket bottom walls, said crown-centering members being arranged respectively adjacent to the central portions of the corresponding ones of said pocket bottom walls and projecting downwardly therefrom and being adapted respectively to embrace top closure crowns provided on bottles carried in another such carrying case, thereby to stabilize said carrying case when it is in a stacked position on top of another such carrying case arranged therebelow, said body and said divider structure and said crown-centering members constituting a one-piece construction molded of a single mass of plastic material with the bottoms of said divider walls integrally joined to said bottom wall and with the opposite ends of said divider walls integrally joined to the adjacent ones of said side and end walls and with said crown-centering members integrally joined to said bottom wall, upstanding handle structure molded of plastic material and extending longitudinally above said one divider wall, the lower portion of said handle structure being spaced above said bottom wall, means connecting the lower portion of said handle structure to said one divider wall, and means connecting the opposite end portions of said handle structure to said end walls, the upper portion of said handle structure being disposed well above the upper side and end edges of said body, whereby the upper portion of said handle structure extends longitudinally over the central portion of said bottom wall and is readily accessible from the exterior.*

*20. The carrying case set forth in claim 19, wherein said divider structure includes a plurality of other divider walls extending laterally between said side walls and located in substantially parallel spaced-apart relation with respect to each other and to said end walls, each of said other divider walls including a pair of upstanding outer end portions respectively integrally joined at the outer edges thereof to the adjacent ones of said side walls and respectively spaced at the inner edges thereof laterally outwardly from said handle structure.*

*21. The carrying case set forth in claim 19, wherein said bottom wall is of generally open-work grill construction including a plurality of longitudinally extending strips and a plurality of laterally extending strips and arranged in corresponding intersecting relation with each other, and each of said pocket bottom walls further includes a plurality of radially arranged straps joining the one of said crown-centering members carried thereby and the respectively adjacent ones of said strips.*

References Cited by the Examiner

The following references, cited by the Examiner, are of record in the patented file of this patent or the original patent.

UNITED STATES PATENTS

| | | | |
|---|---|---|---|
| 1,035,483 | 8/12 | Scott. | |
| 2,365,914 | 12/44 | Stigler | 220—116 |
| 2,416,999 | 3/47 | Keith et al. | 220—104 |
| 2,431,713 | 12/47 | Stigler | 220—116 |
| 2,510,591 | 6/50 | Listman | 220—116 |
| 2,525,633 | 10/50 | Arnett | 220—104 |
| 2,535,113 | 12/50 | Acton | 220—116 |
| 2,535,493 | 12/50 | Gerber | 220—21 |
| 2,593,861 | 4/52 | Eder et al. | 220—21 |
| 2,758,742 | 8/56 | Farrell | 220—21 |
| 2,759,337 | 8/56 | Katz | 220—116 |
| 2,850,153 | 9/58 | Cosentino | 206—45.33 |
| 2,948,433 | 8/60 | Fineo | 220—102 |
| 3,004,657 | 10/61 | Hyman | 220—104 X |
| 3,055,543 | 9/62 | Russo | 220—116 |

GEORGE O. RALSTON, *Primary Examiner.*